(12) United States Patent
Abdalla et al.

(10) Patent No.: US 7,218,291 B2
(45) Date of Patent: May 15, 2007

(54) INCREASED SCALABILITY IN THE FRAGMENT SHADING PIPELINE

(75) Inventors: Karim M. Abdalla, Menlo Park, CA (US); Emmett M. Kilgariff, San Jose, CA (US); Rui M. Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 487 days.

(21) Appl. No.: 10/940,070

(22) Filed: Sep. 13, 2004

(65) Prior Publication Data

US 2006/0055695 A1 Mar. 16, 2006

(51) Int. Cl.
*G09G 1/14* (2006.01)
*G06T 15/50* (2006.01)

(52) U.S. Cl. .................. 345/24; 345/22; 345/426; 345/441

(58) Field of Classification Search ............ 345/20–30, 345/418–428, 441, 501–506
See application file for complete search history.

(56) References Cited

U.S. PATENT DOCUMENTS

2004/0207623 A1* 10/2004 Isard et al. .................. 345/426
2006/0094963 A1* 5/2006 Sumanaweera et al. ..... 600/454
2006/0225061 A1* 10/2006 Ludwig et al. ............. 717/161
2007/0018990 A1* 1/2007 Shreiner ...................... 345/505

* cited by examiner

*Primary Examiner*—Vijay Shankar
(74) *Attorney, Agent, or Firm*—Townsend and Townsend and Crew LLP (57) ABSTRACT

A fragment processor includes a fragment shader distributor, a fragment shader collector, and a plurality of fragment shader pipelines. Each fragment shader pipeline executes a fragment shader program on a segment of fragments. The plurality of fragment shader pipelines operate in parallel, executing the same or different fragment shader programs. The fragment shader distributor receives a stream of fragments from a rasterization unit and dispatches a portion of the stream of fragments to a selected fragment shader pipeline until the capacity of the selected fragment shader pipeline is reached. The fragment shader distributor then selects another fragment shader pipeline. The capacity of each of the fragment shader pipelines is limited by several different resources. As the fragment shader distributor dispatches fragments, it tracks the remaining available resources of the selected fragment shader pipeline. A fragment shader collector retrieves processed fragments from the plurality of fragment shader pipelines.

27 Claims, 5 Drawing Sheets

INCREASED SCALABILITY IN THE FRAGMENT SHADING PIPELINE

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Graphics processing subsystems typically use a stream-processing model, in which input elements are read and operated on by successively by a chain of stream processing units. The output of one stream processing unit is the input to the next stream processing unit in the chain. Typically, data flows only one way, "downstream," through the chain of stream processing units. Examples of stream processing units include vertex processors, which process two- or three-dimensional vertices, rasterizer processors, which process geometric primitives defined by sets of two- or three-dimensional vertices into sets of pixels or sub-pixels, referred to as fragments, and fragment processors, which process fragments to determine their color and other attributes.

Many graphics processing subsystems are highly programmable, enabling implementation of, among other things, complicated lighting and shading algorithms. In order to exploit this programmability, applications can include one or more graphics processing subsystem programs, which are executed by the graphics processing subsystem in parallel with a main program executed by the CPU. Although not confined to merely implementing shading and lighting algorithms, these graphics processing subsystem programs are often referred to as shading programs or shaders.

Each programmable stream processing unit can be adapted to execute its own separate shading program in parallel with shading programs executing on other stream processing units. Implementations of complicated algorithms often depend on separate shading programs tailored to each stream processing unit working together to achieve the desired result. In these implementations, outputs of shading programs for initial stream processing units in a chain may be linked with the inputs of shading programs for subsequent stream processing units in the chain.

The programmable fragment processor is often the bottleneck in improving rendering performance. Typically, the programmable fragment processor must execute its shading program once for each fragment rendered. With fragment shading programs including hundreds or thousands of instructions and each rendered image generated by millions of fragments, the computational requirements of the fragment processor are enormous.

It is therefore desirable to a graphics processing to have a programmable fragment processor having improved performance. It is further desirable that the programmable fragment processor be easily and efficiently scalable to meet different cost and performance targets.

BRIEF SUMMARY OF THE INVENTION

In an embodiment of the invention, a fragment processing unit includes a fragment shader distributor, a fragment shader collector, and a plurality of fragment shader pipelines. Each fragment shader pipeline is adapted to execute a fragment shader program on a segment of fragments. The plurality of fragment shader pipelines operate in parallel, executing the same or different fragment shader programs. The fragment shader distributor receives a stream of fragments from a rasterization unit. The fragment shader distributor dispatches a portion of the stream of fragments to a selected fragment shader pipeline until the capacity of the selected fragment shader pipeline is reached or until no more fragments arrive within a preset duration. The fragment shader distributor then selects another fragment shader pipeline. The portion of the stream of fragments that is sent to the selected fragment shader pipeline is called a fragment stream segment. The capacity of each of the fragment shader pipelines is limited by several different resources. As the fragment shader distributor dispatches fragments, it tracks the remaining available resources of the selected fragment shader pipeline. A fragment shader collector retrieves processed fragments from the plurality of fragment shader pipelines. The fragment shader collector follows the same selection order as the fragment shader distributor to maintain the order of the stream of fragments.

In an embodiment, a graphics processing subsystem including a fragment processor adapted to determine at least one value for each fragment of a stream of fragments. The fragment processor comprises a first fragment shader pipeline adapted to execute at least a portion of a fragment shader program on a segment of fragments. The fragment processor also includes a fragment shader distributor. The fragment shader distributor is adapted to receive a stream of fragments, to select the first fragment shader pipeline to execute a first portion of the stream of fragments, and, for each received fragment of the stream, to determine if the received fragment fits within the segment of fragments of the selected fragment shader pipeline, and to dispatch the received fragment to the selected fragment shader pipeline in response to a determination that the received fragment does fit within the segment of fragments of the selected fragment shader pipeline. A fragment shader collector is adapted to select the first fragment shader pipeline and to retrieve each fragment in the segment of fragments from the fragment shader pipeline selected by the fragment shader collector in response to a signal indicating that the fragment shader pipeline selected by the fragment shader collector has completed the execution of the fragment shader program on the segment of fragments.

In a further embodiment, in being adapted to determine if the received fragment fits within the segment of fragments of the first fragment shader pipeline, the fragment shader distributor is adapted to determine some resource requirements of the received fragment, to determine a measurement of available resources of the selected fragment shader pipeline, and to generate a signal indicating that the received fragment fits within the segment of fragments of the selected fragment shader pipeline in response to a determination that the resource requirements of the received fragment do not exceed the measurement of the available resources of the selected fragment shader pipeline.

In another embodiment, the graphics processing subsystem includes a second fragment shader pipeline adapted to execute at least a portion of a fragment shader program on a segment of fragments. In response to a determination that the received fragment does fit within the segment of fragments of the selected fragment shader pipeline, the fragment shader distributor is adapted to select the second fragment shader pipeline and to dispatch the received fragment to the selected fragment shader pipeline. In an additional embodiment, the fragment shader collector is adapted to receive a signal indicating the selection of the second fragment shader pipeline. In response to the signal, the fragment shader collector is adapted to select the second fragment shader pipeline. The fragment shader collector is further adapted to retrieve each fragment in the segment of fragments from the fragment shader pipeline selected by the fragment shader collector in response to a signal indicating that the fragment shader pipeline selected by the fragment shader collector has completed the execution of the fragment shader program on the segment of fragments.

BRIEF DESCRIPTION OF THE DRAWINGS

The invention will be described with reference to the drawings, in which.

DETAILED DESCRIPTION OF THE INVENTION

Figure 1:
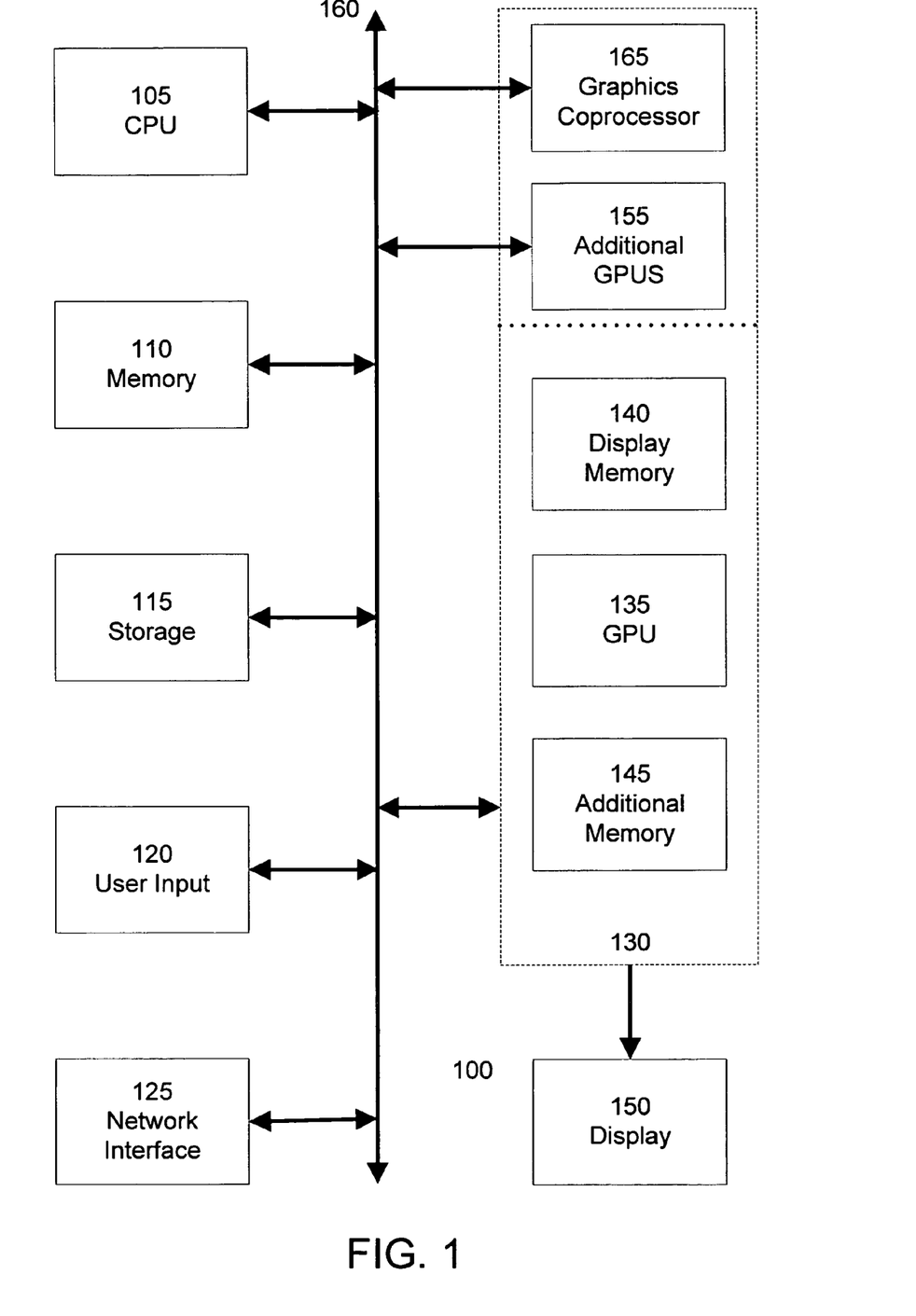
FIG. 1 is a block diagram of an example computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-Express, and HyperTransport data buses.

A graphics subsystem 130 is further connected with data bus 160 and the components of the computer system 100. The graphics subsystem may be integrated with the computer system motherboard or on a separate circuit board fixedly or removably connected with the computer system. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135, or in place of GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and/or additional GPUs 155.

Additional GPUs 155 can be located on the same circuit board as GPU 135 and sharing a connection with GPU 135 to data bus 160, or can be located on additional circuit boards separately connected with data bus 160. Additional GPUs 155 can also be integrated into the same module or chip package as GPU 135. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge or Southbridge chip used to control the data bus 160.

Figure 2:
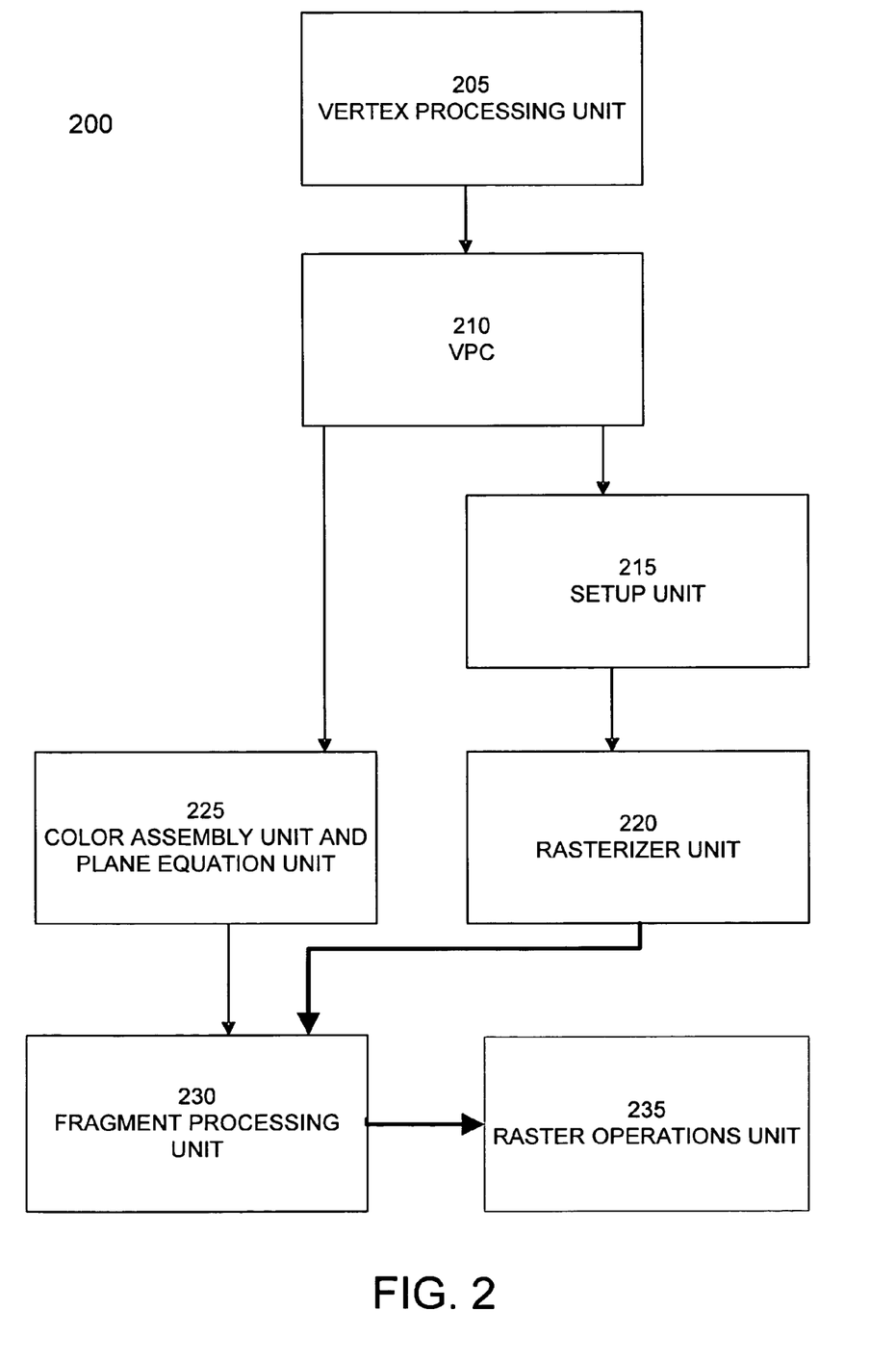
FIG. 2 illustrates a block diagram of a rendering pipeline of a graphics processing subsystem according to an embodiment of the invention.

FIG. 2 illustrates a block diagram of a rendering pipeline 200 of a graphics processing subsystem according to an embodiment of the invention. Pipeline 200 may be implemented in GPU 135 and/or described above. Pipeline 200 includes a vertex processing unit 205, a viewport and culling (VPC) unit 210, a setup unit 215, a rasterizer unit 220, a color assembly block 225, and a fragment processing unit 230.

Vertex processing unit 205 receives rendering commands and data used to define the desired rendered image or images, including geometry, lighting, shading, texturing, motion, and/or camera parameters for a scene. The rendering data may include one or more vertices defining geometric primitives. Each vertex has a position that is typically expressed in a two- or three-dimensional coordinate system. In addition to a position, each vertex also has various attributes associated with it. In general, attributes of a vertex may include any property that is specified on a per-vertex basis. In an embodiment, the vertex attributes include scalar or vector attributes used to determine qualities such as the color, transparency, lighting, shading, and animation of the vertex and its associated geometric primitives.

Vertex processing unit 205 executes one or more vertex programs, also referred to as a vertex shader, on each vertex to create a transformed vertex. The vertex processing unit 205 is programmable and rendering applications can specify the vertex program to be used for any given set of vertices. In a simple embodiment, the vertex program transforms a vertex from a three-dimensional world coordinate system to a two-dimensional screen coordinate system. More complicated vertex programs can be used to implement a variety of visual effects, including lighting and shading, procedural geometry, and animation operations. Numerous examples of such "per-vertex" operations are known in the art and a detailed description is omitted as not being critical to understanding the present invention. Vertex shader programs can implement algorithms using a wide range of mathematical and logical operations on vertices and data, and can include conditional or branching execution paths and direct and indirect memory accesses.

The viewport and culling unit 210 culls or discards geometric primitives and/or portions thereof that are outside the field of view or otherwise unseen in the rendered image. By discarding geometric primitives that are not seen in the rendered image, culling decreases the number of geometric primitives to be processed by downstream processing stages of the rendering pipeline 200 and thus increases rendering speed.

Setup unit 215 assembles one or more vertices into a geometric primitive, such as a triangle or quadrilateral. The rasterization stage 220 then converts each geometric primitive into one or more pixel fragments. A pixel fragment defines a set of one or more pixels to be potentially displayed in the rendered image. Each pixel fragment coming out of the rasterizer includes information defining the potential coverage of the associated geometric primitive in the rendered image, for example image coordinates of the pixels associated with the fragment and sub-pixel coverage of the associated geometric primitive at that pixel location. The pixel fragments are provided to the fragment processor, discussed below.

Color assembly and Plane Equation Setup block 225 associates the per-vertex attributes, such as vertex colors, vertex depth values, vertex normal vectors, and texture coordinates, received from vertex processing unit 205 with other attributes of pre-rasterized geometric primitive such as vertex positions and computes other per-geometric primitive attributes such as plane equation coefficients for interpolating the per-vertex attributes values at any point within the pixel fragments, given those fragments' positions. The per-geometric primitive attributes of the fragments are provided to fragment processor 230.

Fragment processor 230 uses the rasterizer-generated position information associated with each pixel fragment in conjunction with the per-vertex and per-geometric primitive attributes from the Color Assembly and Plane Equation Setup unit and in conjunction with a fragment shader program to determine the output values (for example color and depth) of each fragment. Like the vertex processor 205, the fragment processing unit is programmable. A pixel fragment program, also referred to as a pixel or fragment shader, is executed on each pixel fragment to determine an output color value for a pixel. Although the pixel fragment program operates independently of the vertex shader program, the pixel fragment program may be dependent upon information created by or passed through previous stream processing units, including information created by a vertex program.

Rendering applications can specify the pixel fragment program to be used for any given set of pixel fragments. Pixel fragment programs can be used to implement a variety of visual effects, including lighting and shading effects, reflections, texture mapping and procedural texture generation. Numerous examples of such "per-pixel" operations are known in the art and a detailed description is omitted as not being critical to understanding the present invention. Pixel fragment shader programs can implement algorithms using a wide range of mathematical and logical operations on fragments and data, and can include conditional or branching execution paths and direct and indirect memory accesses.

The shaded fragments are then output to the raster operations and storage unit 235, along with attributes such as fragment color, depth, and stencil values. The raster operations unit 235 integrates the fragments output from the fragment processing unit 230 with the portion of the rendered image already stored in the frame buffer. Fragments can be blended or masked with pixels previously written to the rendered image in the frame buffer. Depth buffers, alpha buffers, and stencil buffers can also be used to determine the contribution of each incoming fragment, if any, to the rendered image. The combination of each incoming fragment and any previously stored pixel values in the frame buffer is then output to the frame buffer, which for example is located in display memory 140, as part of the rendered image.

Figure 3:
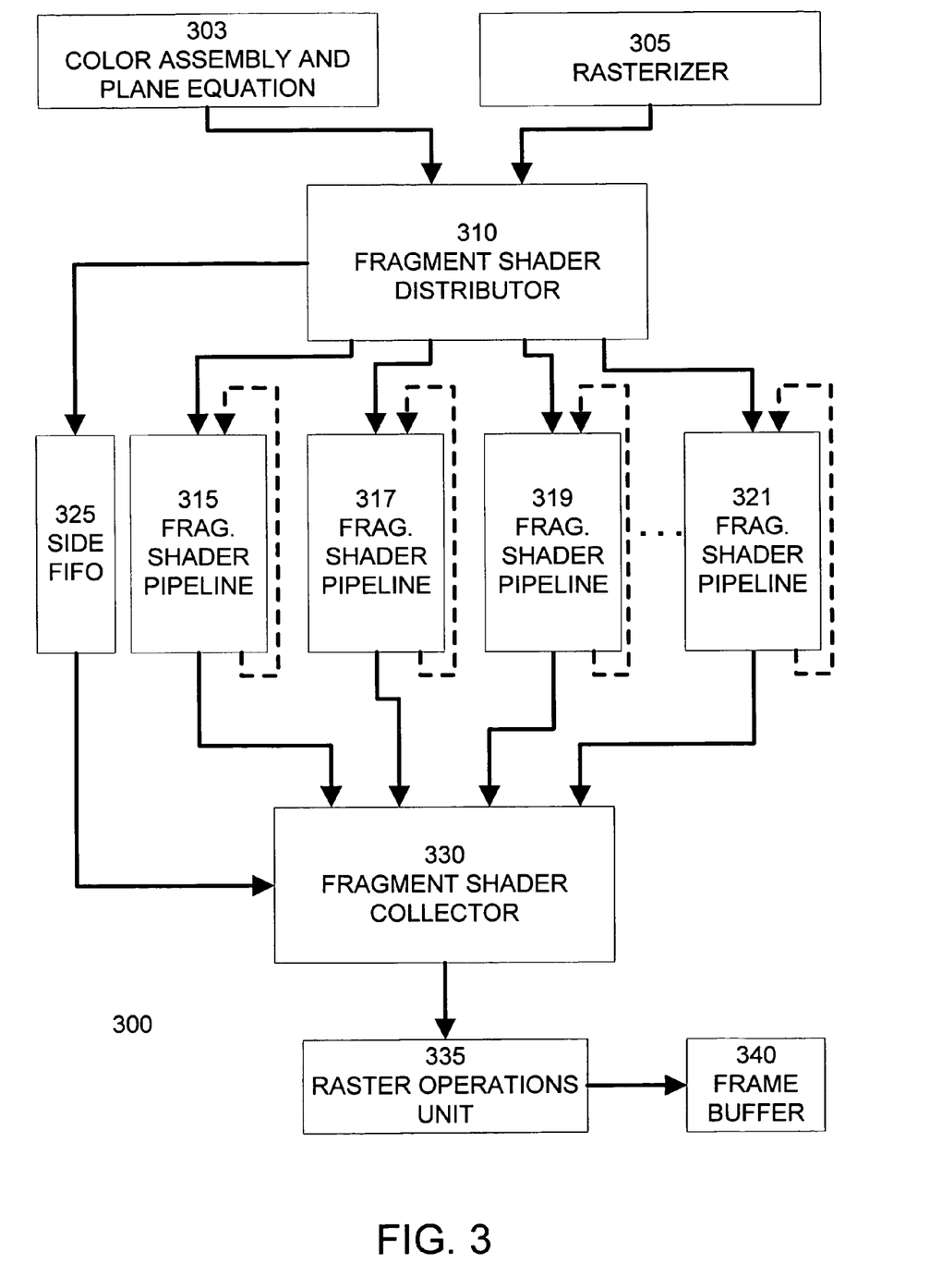
FIG. 3 illustrates a fragment shader portion of a fragment processing unit according to an embodiment of the invention.

FIG. 3 illustrates a fragment shader portion of a fragment processing unit according to an embodiment of the invention. In this embodiment, the fragment shader 300 includes fragment shader distributor 310, a plurality of fragment shader pipeline units 315, 317, 319, and 321, a side FIFO 325, and a fragment shader collector 330. In the example of FIG. 3, there are four fragment shader pipelines. However, alternate embodiments can include only one or any other number of fragment shader pipelines, limited only by the manufacturing process used to create the graphics processing subsystem. In this embodiment, the fragment shader distributor 310 receives a stream of fragments from the rasterizer 305 (and their associated rasterizer-generated attributes) along with their associated per-geometric primitive fragment attributes from the color assembly and plane equation unit 303, which in a further embodiment corresponds with the outputs of the rasterizer unit 220 and color assembly and plane equation setup unit 225.

In a further embodiment, the fragment shader distributor 310 receives the stream of fragments in the form of a stream of fragment groups. Each fragment group includes a groups of spatially adjacent fragments. In one implementation, a fragment group comprises a two-pixel-by-two-pixel array sized fragment, sometimes referred to as a quad. In alternate implementations, fragment groups can include any other arrangement of fragments.

Associated with each fragment group is a set of fragment attributes coming directly from the rasterizer including coordinates indicating the position of each fragment and coverage information indicating the potential visibility of each fragment. Each incoming fragment group also has associated with it a set of additional attributes already-interpolated or to-be-interpolated from the per-geometric primitive attributes coming from the color assembly and plane equation setup unit.

These interpolated fragment attributes may include base color, transparency, depth information, texture coordinates, and texture mode information (e.g. texture filtering and texture boundary behavior). In an embodiment these other attributes are initially associated with the geometric primitive used by the rasterization stage 220 to create the fragment groups of the primitive, and this association carries over to the fragment groups as the geometric primitive is converted to fragments. In a further embodiment, the values of some or all of the attributes of a geometric primitive may be interpolated by the fragment processing unit to determine the values for each set of fragment attributes.

Any or all of the attributes associated with each incoming fragment may be used by the fragment shader portion of the fragment processing unit to determine the output (e.g. final color and depth) of the respective fragment.

The fragment shader distributor 310 organizes the received stream of fragment groups into one or more segments. A segment is a set of fragment groups that can be processed by a fragment shader pipeline at one time. As discussed in detail below, an embodiment of the fragment shader pipeline is a pipelined processing unit adapted to execute the instructions of a fragment shader program on each of the fragments in a segment. In an embodiment, the number of fragment groups in a segment is limited by the processing resources of the fragment shader pipeline, which include the number of stages in the fragment shader pipeline, the number of data registers needed for each fragment group to execute the fragment shader program, and the number of sets of attributes associated with the fragment groups of the segment. To maximize the performance of the fragment shader pipeline, the fragment shader distributor 310 attempts to form segments with the largest possible number of fragment groups, taking into account the processing resource limits of the fragment shader pipeline.

In its initial state, the fragment shader distributor 310 selects one of the plurality of fragment shader pipelines to receive a first segment of fragment groups. As the fragment shader distributor 310 receives fragment groups, it determines whether the fragment group fits within the current segment. If the limits of the segment have not been reached, then the fragment shader distributor 310 forwards the fragment group to the selected fragment pipeline. In an embodiment, the fragment shader distributor 310 continually processes and dispatches fragment groups to the selected fragment shader pipeline as they are received from the rasterizer 305. Once the limits of the current segment are reached, the fragment shader distributor 310 selects another fragment shader pipeline and begins a new segment. The fragment shader distributor 310 will send subsequent fragment groups of the new segment to the newly selected fragment shader pipeline.

In an embodiment, the fragment shader distributor 310 selects fragment shader pipelines using a round-robin approach. In an example of this embodiment, the fragment shader distributor 310 would send fragment groups first to fragment shader pipeline 315 until the limits of the first segment are reached. Subsequent fragment groups would be sent to fragment shader pipeline 317 until the limits of the second segment are reached. This would be repeated for all of the fragment shader pipelines, with fragment groups directed back to the fragment shader pipeline 315 after the segment associated with the last fragment shader pipeline 321 is complete. If the selected fragment shader pipeline has not released sufficient processing resources from processing its previous segment of fragment groups to allow accepting fragment groups of a new segment, then the fragment shader distributor 310 pauses until the selected fragment shader pipeline has sufficient resources to begin accepting fragment groups from the new segment.

Each of the fragment shader pipelines 315, 317, 319, and 321 are adapted to execute the instructions of a fragment shader program on each of the fragments in a segment. In an embodiment, each fragment shader pipeline includes a number of execution stages that perform a perspective correction operation, a texture map lookup operation, a blending operation, and other operations. A register file in each fragment pipeline unit stores data values associated with each fragment group as it is executed. For a complex fragment shader program, the fragment groups of a segment recirculate through the fragment shader pipeline one or more times, with each subsequent pipeline pass executing additional portions of the fragment shader program. As fragment groups are recirculated back to the beginning of the fragment shader pipeline for having additional instructions applied to them, the register values computed during that pass through the fragment shader pipeline for each fragment are used to update the register file state of the respective fragment. In an embodiment, each pipeline stage of the fragment shader pipeline receives instructions, in the form of microcode, from a shader instruction unit, which is omitted from FIG. 3 for clarity.

Some of the attributes associated with the groups of fragments in a segment do not affect the processing of the segment by the fragment shader pipeline. These are referred to as pass-through attributes. Furthermore, the stream of fragments from the rasterizer 305 may also include other commands or data, referred to as state bundles, that need to be communicated with other portions of the graphics pipeline downstream from the fragment processing unit, such as the raster operations unit 335.

To improve the performance of the plurality of fragment shader pipelines, an embodiment of the fragment shader 300 separates these pass-through attributes from their corresponding segments sent to the fragment shader pipeline and diverts the pass-through attributes and state bundles to a side FIFO 325. Side FIFO 325 is a first-in/first-out buffer. In an embodiment, as the fragment shader distributor 310 sends a fragment group to the selected fragment shader pipeline, the fragment shader distributor 310 also inserts a corresponding fragment packet into the side FIFO 325. In a further embodiment, when the fragment shader distributor 310 sends the last fragment group of a segment to the fragment shader pipeline, the corresponding fragment packet sent to the side FIFO 325 includes an end-of-segment indicator. As discussed below, the end-of-segment indicator is used by the fragment shader collector 330 to reassemble fragment groups with their corresponding pass-through attributes. Additionally, when the fragment shader distributor 310 receives a state bundle in the stream of fragments, the fragment shader distributor 310 sends the state bundle directly to the side FIFO 325. In an embodiment, if a state bundle affects a mode of the set of fragment shader pipelines, then the fragment shader distributor 310 distributes a copy of the state bundle to each of the plurality of fragment shader pipelines in addition to the side FIFO 325.

The fragment shader collector 330 retrieves processed fragment groups from the fragment shader pipelines, recombines them with their corresponding pass-through attributes from the side FIFO 325, and forwards them to the raster operations unit 335, which may then store the fragment groups in frame buffer 340 if they are not masked off, for example by a depth buffer, stencil buffer, and/or alpha buffer. In an embodiment, the fragment shader collector 330 references the side FIFO 325 to preserve the order of the stream of fragments processed by the fragment shader unit. In this embodiment, the initial state of the fragment shader collector 330 selects the same fragment shader pipeline as the fragment shader distributor 310 selects. The fragment shader collector 330 then retrieves the first data item from the side FIFO 325. If the data item retrieved is a fragment packet, fragment shader collector 330 waits until the selected fragment shader pipeline finishes processing the corresponding fragment group. The fragment shader collector 330 then retrieves the corresponding fragment group from the selected fragment shader pipeline, combines it with the pass-through attributes of the fragment packet, and sends the fragment group to the raster operations unit 335. This is repeated for subsequent fragment packets in the side FIFO 325.

If a fragment packet includes an end-of-segment indicator, then the fragment shader collector 330 will select the next fragment shader pipeline in the sequence to retrieve fragment groups. The sequence used by the fragment shader collector 330 is the same as the sequence used by the fragment shader distributor 310, for example, a round-robin sequence. Because the fragment shader distributor 310 and the fragment shader collector 330 both use the same sequence, the segments of fragment groups will be read by the fragment shader collector 330 in the same order that they are sent by the fragment shader distributor 310. Furthermore, because the fragment shader pipelines each output fragment groups in the same order they are received, the fragment packets in the side FIFO 325 will be in the same order as the fragment groups output by the fragment shader pipelines. Moreover, using a single end-of-segment indicator, rather than a specific fragment shader pipeline identification number, allows the number of fragment shader pipelines to be changed without needing to widen the side FIFO 325 to hold additional bits of information.

Additionally, as bundles in the side FIFO 325 do not have any corresponding fragment group, the fragment shader collector 330 can read bundles from the side FIFO 325 and output them to the raster operations unit 335 without waiting for a fragment shader pipeline to finish processing. Because the side FIFO 325 preserves the order of the fragment stream, in an embodiment, the side FIFO 325 must include sufficient entries to hold fragment packets for all of the segments being processed at a given time by all of the fragment shader pipelines, plus additional entries for bundles and other overhead, such as for fragment groups stored in input and output buffers for each shader pipeline unit.

The fragment shader 300 can include any number of fragment shader pipelines, allowing performance to be easily scaled to meet performance or cost goals. Furthermore, increasing the number of fragment shader pipelines incurs very little additional area or complexity overhead in the fragment shader 300 beyond the actual area of the additional fragment shader pipelines instantiated. Typical device manufacturing processes often introduce point defects that may damage a small portion of the device but allow the remainder of the device to operate normally. To increase manufacturing yields, an embodiment of the fragment shader 300 is manufactured with a number of fragment shader pipelines in excess of the desired number. After manufacturing, each fragment shader pipeline is tested, and if it is defective due to a point defect, a set of fuses or other one-time-programmable memory is programmed to indicate the defective fragment shader pipelines. Using this stored indicator, both the fragment shader distributor 310 and the fragment shader collector 330 are adapted to skip over defective fragment shader pipelines. This allows the fragment shader 300 to operate normally with the remaining, non-defective fragment shader pipelines. Thus, devices that would otherwise be defective are capable of being salvaged as functional devices, increasing manufacturing yields and reducing costs.

Figure 4:
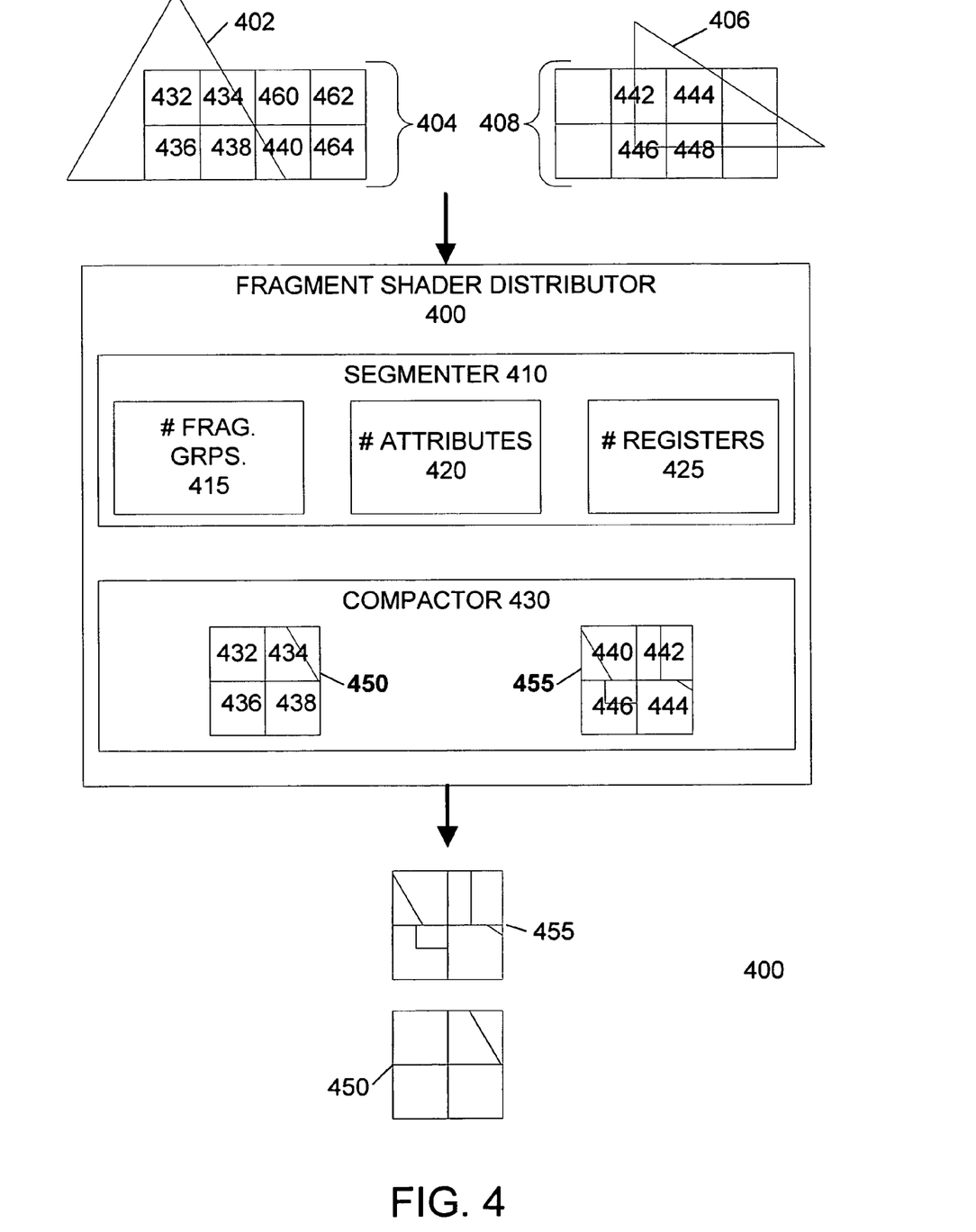
FIG. 4 illustrates a fragment shader distributor according to an embodiment of the invention.

FIG. 4 illustrates a fragment shader distributor 400 according to an embodiment of the invention. As discussed above, the fragment shader distributor organizes the stream of fragments into segments and distributes the fragments in a segment to the selected fragment shader pipeline. In an embodiment, the fragment shader distributor 400 receives the stream of fragments in the form a stream of 8-blocks from the rasterizer. In FIG. 4, the stream of fragments include two example 8-blocks of fragments, 404 and 408. In this example, the rasterizer produces the example 8-blocks of fragments from geometric primitives 402 and 406. Each 8-block of fragments includes eight fragment groups. As discussed above, in an embodiment, each fragment group corresponds to four pixels in a two by two array. Each 8-block of fragments covers at least part of its associated geometric primitive. For example, in 8-block 404, fragment groups 432, 434, 436, 438, and 440 are covered by at least part of geometric primitive 402. The remaining fragment groups of 8-block 404, fragment groups 460, 462, and 464, are not covered by the geometric primitive 402.

The fragment shader distributor 400 includes a segmenter 410 for determining segment boundaries. As discussed above, a segment is a set of fragment groups to be processed at one time by a fragment shader pipeline. The size of the segment is limited by the resources of the fragment shader pipeline. Fragment shader pipeline resources can include the number of pipeline stages, which can limit the number of fragments or fragment groups, the number of data registers, and the number of attributes associated with the geometric primitives associated with the fragment groups of the segment. In a further embodiment, other events, such as a receiving no more fragment groups from the rasterizer 305 within a preset time limit, may cause a segment to be closed before any resource limit of the selected fragment shader pipeline is reached.

In an embodiment, the segmenter 410 predetermines the amount of fragment shader pipeline resources that will be consumed by any single forthcoming fragment group as it would be processed by the fragment shader distributor 400.

The per-fragment resource usage is based on the current graphics state and, in a further embodiment, whether any given fragment is from a different geometric primitive than the previous fragment. Additionally, a set of counters track the cumulative fragment pipeline resources consumed after processing a fragment group. Each counter corresponds with a resource of the fragment shader pipeline. In an embodiment, the segmenter 410 includes a fragment group counter 415, a geometric primitive attribute counter 420, and a fragment program register usage counter 425. As the fragment shader distributor 400 processes each fragment group, the values of the set of counters are changed to reflect the resources consumed by the fragment group.

Each counter further has a limiting value corresponding with the limit of the resource in the fragment shader pipeline. When the limit value of one or more of the counters is reached, the segmenter 410 sends a signal indicating that the segment for the currently selected fragment shader pipeline is complete. In response, the fragment shader distributor 400 selects the next fragment shader pipeline in the sequence and resets the set of counters of the segmenter 410 to their initial values indicating that no resources have been used yet for the new segment. In an additional embodiment, the fragment shader distributor 400 also adds an end-of-segment indicator to the fragment packet associated with the last fragment group of the segment. The fragment shader distributor 400 then continues to process subsequent fragment groups in the stream from the rasterizer, sending subsequent fragment shader groups to the newly selected fragment shader pipeline.

In an example, upon receiving 8-block 404 from the rasterizer, the segmenter 410 will change the fragment group counter 415 by five, corresponding to the five covered fragment groups 432, 434, 436, 438, and 440. As discussed in detail below, the segmenter 410 disregards the remaining uncovered fragment groups in the 8-block 404, which are fragment groups 460, 462, and 464, because the compactor 430 will discard these empty fragment groups. In an embodiment, each fragment shader pipeline can process up to 220 fragment groups in a segment; thus, the limiting value for the fragment group counter 415 is 220.

Additionally, the fragment groups 432, 434, 436, 438, and 440 are all associated with the geometric primitive 402. Each geometric primitive is further associated with a set of attributes. In an embodiment, the set of attributes includes plane equation parameters, color, fog value, texture coordinates, clipping planes, and/or other scalar or vector values to be applied to or interpolated over the geometric primitive. As the fragment groups are processed by the fragment shader distributor 400, the attribute counter is changed by the number of attributes associated with the fragment groups. For example, if the geometric primitive 402 is associated with five attributes, such as color, fog, three-component texture coordinates, then the attribute counter 420 is changed by 5 as its associated fragment groups are processed. In one implementation, each fragment shader pipeline can store a set of four attributes for each of sixty-four different geometric primitives; thus the limiting value of the attribute counter 420 is 256 attributes. In an additional embodiment, the number of attributes per geometric primitives can be increased at the expense of reducing the maximum number of fragments in a segment, or vice-versa.

In a further embodiment, attribute storage space requirements is minimized by storing only one copy of the set of attributes for a given geometric primitive, regardless of the number of fragment groups associated with the primitive. In this embodiment, the segmenter 410 only needs to count the attributes for a geometric primitive once, rather than for each fragment associated with the primitive. In one implementation of this embodiment, the rasterizer processes each geometric primitive in turn; thus, the rasterizer outputs all of the fragment groups associated with a given geometric primitive before outputting fragments associated with another geometric primitive. Upon completing the processing of a given geometric primitive, the rasterizer inserts an end-of-primitive indicator into the stream of fragment groups. Upon receiving the end-of-primitive indicator, the segmenter 410 increments the attribute counter 420 by the number of attributes associated with the geometric primitive containing the next fragment group in the stream. In this implementation, the segmenter 410 does not increment the attribute counter 420 for subsequent fragment groups in the stream until it receives another end-of-primitive indicator. In this embodiment, the number of attributes per geometric primitives can be increased at the expense of reducing the maximum number of geometric primitives that can be stored and associated with fragments in a segment, thereby possibly, but not necessarily, limiting the number of fragment groups in a segment, or vice-versa.

Furthermore, the fragment shader pipeline typically uses several data registers to temporarily store data while executing the fragment shader program on each fragment. Because each fragment is executed by a separate instance of the fragment shader program, each fragment requires its own set of data registers. In an embodiment, each fragment shader pipeline can dynamically allocate its pool of data registers among the fragment groups of a segment. For example, if the fragment shader pipeline includes 880 data registers, then a segment using four data registers per fragment group to execute its fragment shader program can include up to 220 fragment groups. Similarly, a segment using five data registers per fragment group can include up to 176 fragment groups. As the fragment shader distributor 400 processes fragment groups, the segmenter 410 changes the register counter 425 to reflect the number of data registers needed by each fragment group to execute the fragment shader program.

Compactor 430 discards uncovered fragment groups, such as fragment groups 460, 462, and 464 of 8-block 404, and, in an embodiment, reorganizes the remaining fragment groups into 4-blocks, which are each a set of four fragment groups that may be associated with the same or different geometric primitives. For example, compactor 430 organizes fragment groups 432, 434, 436, and 438 into 4-block 450 and fragment groups 440, 442, 444, and 446 into 4-block 455. It should be noted that 4-block 455 includes fragment groups associated with different geometric primitives, in this example geometric primitives 402 and 406. In this example, fragment group 448 will be included in a subsequent 4-block, which has been omitted for clarity. The fragment shader distributor 400 sends the 4-blocks of fragment groups created by the compactor 430 to the selected fragment shader pipeline.

With multiple fragment shader pipelines operating in parallel, as illustrated in FIG. 3, the fragment shader pipelines will typically perform texture lookups and other memory accesses at approximately the same time. As a result, the rate of cache and external memory data access requests will be uneven, with long idle periods interspersed with periods of heavy access. To even out the rate of memory accesses and reduce overall latency, an embodiment of the invention uses an instruction timing scheme to stagger memory accesses.

Figure 5:
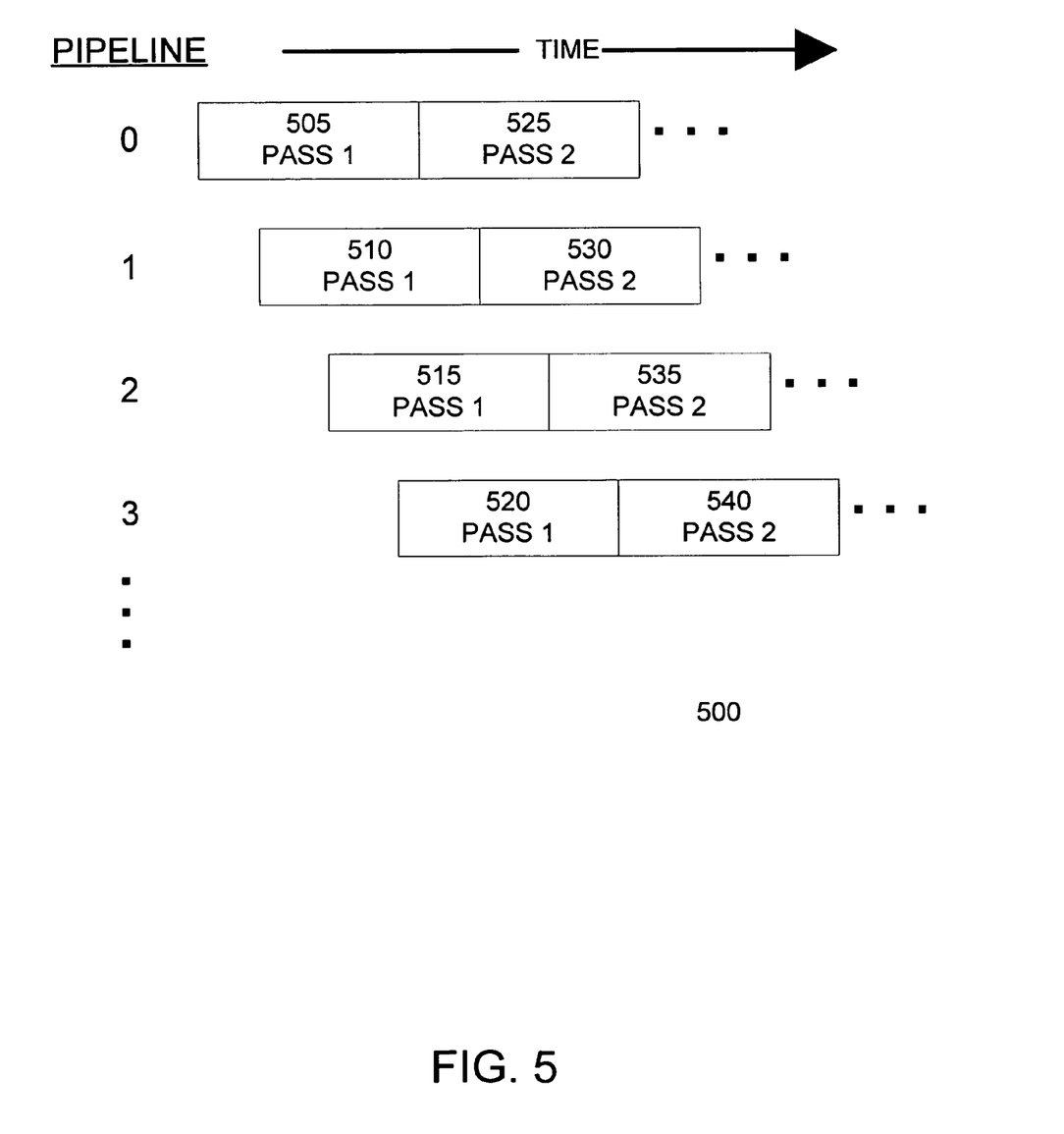
FIG. 5 illustrates an instruction timing scheme according to an embodiment of the invention.

FIG. 5 illustrates an instruction timing scheme 500 according to an embodiment of the invention. In timing scheme 500, the set of fragment shader instructions for a first pass 505 of a first fragment shader pipeline are issued, and the first fragment shader pipeline begins to execute these instructions. The timing scheme 500 then waits for a brief period of time before sending the set of fragment shader instructions for a first pass 510 of a second fragment shader pipeline. Following another delay, this is repeated for the sets of fragment shader instructions for the first passes 515 and 520 of a third and fourth fragment shader pipelines, respectively. As a result, the fragment shader pipelines execute their respective fragment shader programs in a staggered fashion, so that memory accesses from the set of fragment shader pipelines are spread out over a longer period of time, reducing the peak number of simultaneous memory requests and consequently, the average latency of memory accesses. This staggering of instructions is repeated for additional passes of fragment shader instructions, such as for the sets of fragment shader instructions for the second passes 525, 530, 535, and 540 of the set of fragment shader pipelines.

This invention enables the performance of the fragment processing unit of a graphics processing subsystem to be scaled to be easily and efficiently scalable to meet different cost and performance targets. Although the invention has been described with reference to an example fragment processing unit with four fragment shader pipelines, the invention may be applied to any type of processing unit with any number of parallel pipelines in a stream processing system. The invention has been discussed with respect to specific examples and embodiments thereof; however, these are merely illustrative, and not restrictive, of the invention. Thus, the scope of the invention is to be determined solely by the claims.

What is claimed is:

1. A method for determining at least one value for each pixel fragment of a stream of fragments, the method comprising:
   selecting a first fragment shader pipeline adapted to execute at least a portion of a fragment shader program on a segment of fragments and having at least one available resource;
   receiving a fragment in a stream of fragments;
   reducing a measurement of the available resource of the selected fragment shader pipeline by a resource requirement of the received fragment;
   dispatching the received fragment to the selected fragment shader pipeline to be processed by the fragment shader program of the selected fragment shader pipeline;
   dispatching a fragment packet including an attribute of the received fragment to a FIFO;
   repeating the steps of receiving, reducing, dispatching the received fragment, and dispatching a fragment packet for a first plurality of subsequent fragments in the stream of fragments in response to the measurement of the available resource of the selected fragment shader pipeline not reaching a resource limit value;
   in response to the measurement of the available resource of the selected fragment shader pipeline reaching the resource limit value, selecting a second fragment shader pipeline adapted to execute at least a portion of a fragment shader program on a segment of fragments and having at least one available resource; and
   repeating the steps of receiving, reducing, dispatching the received fragment, and dispatching a fragment packet for a second plurality of subsequent fragments in the stream of fragments in response to the measurement of the available resource of the selected fragment shader pipeline not reaching a resource limit value.

2. The method of claim 1, wherein the step of dispatching the fragment packet comprises including an end-of-segment indicator in the fragment packet in response to the measurement of the available resource of the selected fragment shader pipeline reaching the resource limit value.

3. The method of claim 2, further comprising:
   selecting the first fragment shader pipeline for retrieval of fragments;
   retrieving the fragment packet from the FIFO;
   retrieving a corresponding fragment from the fragment shader pipeline selected for retrieval of fragments;
   combining the attribute of the retrieved fragment packet with the corresponding fragment to form a combined fragment;
   dispatching the combined fragment to a subsequent stream processing unit;
   repeating the steps of retrieving, combining, and dispatching for a subsequent fragment packet in the FIFO in response to a determination that the fragment packet does not include the end-of-segment indicator; and
   selecting the second fragment shader pipeline for retrieval of fragments in response to the fragment packet including the end-of-segment indicator.

4. The method of claim 1, wherein the first and second fragment shader pipelines are interfaced with a cached memory subsystem, and the method further comprises:
   prior to repeating the steps of receiving, reducing, dispatching the received fragment, and dispatching a fragment packet for the second plurality of subsequent fragments in the stream of fragments, pausing for a period of time, wherein the length of the period of time optimizes a set of memory accesses from the first and second fragment shader pipelines to the cached memory system.

5. The method of claim 1, wherein the attribute of the fragment packet includes a fragment position.

6. A graphics processing subsystem including a fragment processor adapted to determine at least one value for each of a stream of fragments, the fragment processor comprising:
   a first fragment shader pipeline adapted to execute at least a portion of a fragment shader program on a segment of fragments;
   a fragment shader distributor adapted to receive a stream of fragments, to select the first fragment shader pipeline to execute a first portion of the stream of fragments, and, for each received fragment of the stream, to determine if the received fragment fits within the segment of fragments of the selected fragment shader pipeline, and to dispatch the received fragment to the selected fragment shader pipeline in response to a determination that the received fragment does fit within the segment of fragments of the selected fragment shader pipeline; and
   a fragment shader collector adapted to select the first fragment shader pipeline and to retrieve each fragment in the segment of fragments from the fragment shader pipeline selected by the fragment shader collector in response to a signal indicating that the fragment shader pipeline selected by the fragment shader collector has completed the execution of the fragment shader program on the segment of fragments.

7. The graphics processing subsystem of claim 6, wherein in being adapted to determine if the received fragment fits within the segment of fragments of the first fragment shader pipeline, the fragment shader distributor is adapted to determine some resource requirements of the received fragment, to determine a measurement of available resources of the selected fragment shader pipeline, and to generate a signal indicating that the received fragment fits within the segment of fragments of the selected fragment shader pipeline in response to a determination that the resource requirements of the received fragment do not exceed the measurement of the available resources of the selected fragment shader pipeline.

8. The graphics processing subsystem of claim 7, wherein the fragment shader distributor further comprises a plurality of counters, each counter corresponding to a resource of the selected fragment shader pipeline, and wherein the fragment shader distributor is further adapted to change the values of the plurality of counters by the resource requirements of each of the received fragments.

9. The graphics processing subsystem of claim 8, wherein each of the plurality of counters is associated with a resource limit value representing the limit of the corresponding resource of the selected fragment shader pipeline, and in being adapted to generate a signal indicating that the received fragment fits within the segment of fragments of the first fragment shader pipeline, the fragment shader distributor is adapted to determine that none of the plurality of counters have reached their associated resource limit values.

10. The graphics processing subsystem of claim 6, further comprising:
   a second fragment shader pipeline adapted to execute at least a portion of a fragment shader program on a segment of fragments; and
   wherein in response to a determination that the received fragment does not fit within the segment of fragments of the selected fragment shader pipeline, the fragment shader distributor is adapted to select the second fragment shader pipeline and to dispatch the received fragment to the newly selected fragment shader pipeline.

11. The graphics processing subsystem of claim 10, wherein the fragment shader collector is adapted to receive a signal indicating the selection of the second fragment shader pipeline and, in response to the signal:
   to select the second fragment shader pipeline and to retrieve each fragment in the segment of fragments from the fragment shader pipeline selected by the fragment shader collector in response to a signal indicating that the fragment shader pipeline selected by the fragment shader collector has completed the execution of the fragment shader program on the segment of fragments.

12. The graphics processing subsystem of claim 11, wherein the fragment shader collector receives the signal via side FIFO.

13. The graphics processing subsystem of claim 12, wherein the fragment shader distributor is further adapted to insert a fragment packet in the side FIFO for each received fragment dispatched to one of the fragment shader pipelines.

14. The graphics processing subsystem of claim 13, wherein each fragment packet includes a set of attributes of the received fragment.

15. The graphics processing subsystem of claim 14, wherein the fragment shader collector is adapted to match the set of attributes of each fragment packet with the corresponding retrieved fragment from the fragment shader pipeline selected by the fragment shader collector.

16. The graphics processing subsystem of claim 11, further comprising:
   a third fragment shader pipeline adapted to execute at least a portion of a fragment shader program on a segment of fragments;
   wherein in response to a determination that the received fragment does not fit within the segment of fragments of the second fragment shader pipeline, the fragment shader distributor is adapted to select the third fragment shader pipeline and to dispatch the received fragment to the newly selected fragment shader pipeline; and
   wherein the fragment shader collector is adapted to receive a signal indicating the selection of the third fragment shader pipeline and, in response to the signal:
   to select the third fragment shader pipeline and to retrieve each fragment in the segment of fragments from the fragment shader pipeline selected by the fragment shader collector in response to a signal indicating that the fragment shader pipeline selected by the fragment shader collector has completed the execution of the fragment shader program on the segment of fragments.

17. The graphics processing subsystem of claim 16, wherein the fragment shader distributor and fragment shader collector are adapted to select from a plurality of fragment shader pipelines in a round-robin order.

18. The graphics processing subsystem of claim 10, wherein the first and second fragment shader pipelines are adapted to execute the separate instances of the same fragment shader program in parallel.

19. The graphics processing subsystem of claim 10, wherein the first and second fragment shader pipelines are adapted to execute the separate instances of different fragment shader programs in parallel.

20. The graphics processing subsystem of claim 7, wherein the available resources of the selected fragment shader pipeline include a maximum number of fragments in the segment of fragments.

21. The graphics processing subsystem of claim 20, wherein the maximum number of fragments in the segment of fragments corresponds with the number of pipeline stages in the selected fragment shader pipeline.

22. The graphics processing subsystem of claim 7, wherein the available resources of the selected fragment shader pipeline include a set of data registers, and wherein the resource requirements of the received fragment include a data register requirement, the data register requirement determined by the fragment shader program to be executed on the received fragment.

23. The graphics processing subsystem of claim 7, wherein the available resources of the selected fragment shader pipeline include an attribute data storage, and wherein the resource requirements of the received fragment include a set of attributes associated with the received fragment.

24. The graphics processing subsystem of claim 23, wherein the set of attributes associated with the received fragment are inherited from a set of attributes of a geometric primitive.

25. The graphics processing subsystem of claim 6, wherein the fragment shader distributor is adapted to discard the received fragment in response to a determination that the received fragment does not cover an associated geometric primitive.

26. The graphics processing subsystem of claim 25, wherein the received fragment is part of a fragment group including a plurality of fragments, and wherein the fragment shader distributor is adapted to replace the discarded fragment in the fragment group with a second received fragment and to dispatch the fragment group including the second received fragment to the selected fragment shader pipeline.

27. The graphics processing subsystem of claim 23, wherein a maximum number of geometric primitives associated with the segment of fragments is inversely proportional to the size of the set of attributes associated with the received fragment.

* * * * *